United States Patent [19]
Campagnolo

[11] Patent Number: 6,036,279
[45] Date of Patent: Mar. 14, 2000

[54] SPOKE FOR A BICYCLE WHEEL AND WHEEL INCLUDING THIS SPOKE

[75] Inventor: Valentino Campagnolo, Vicenza, Italy

[73] Assignee: Campagnolo S.r.l., Vicenza, Italy

[21] Appl. No.: 08/995,864

[22] Filed: Dec. 22, 1997

[30] Foreign Application Priority Data

Mar. 28, 1997 [IT] Italy .................................. T097A0264

[51] Int. Cl.[7] .................................................. B60B 1/02
[52] U.S. Cl. ................................ 301/55; 301/57; 301/58; 301/59; 301/56
[58] Field of Search ............................... 301/104, 55, 56, 301/58, 59, 61

[56] References Cited

U.S. PATENT DOCUMENTS

| | | | |
|---|---|---|---|
| 456,218 | 7/1891 | Goodrich | 301/104 |
| 528,887 | 11/1894 | Myers | 301/59 |
| 646,306 | 3/1900 | Muller | 301/58 |
| 677,525 | 7/1901 | Loverin | 301/55 |
| 705,567 | 7/1902 | Edwards | 301/58 |
| 910,001 | 1/1909 | Jenkinson | 301/104 |
| 1,059,098 | 4/1913 | Zarth | 301/104 |
| 1,479,694 | 1/1924 | Bleado | 301/104 |
| 4,300,804 | 11/1981 | Hasebe | 301/56 |
| 5,429,421 | 7/1995 | Watson | 301/61 |
| 5,489,147 | 2/1996 | Borsai | 301/59 |
| 5,626,401 | 5/1997 | Terry, Sr. et al. | 301/59 |
| 5,795,036 | 8/1998 | Campagnolo | 301/59 |

*Primary Examiner*—S. Joseph Morano
*Assistant Examiner*—Long Bao Nguyen
*Attorney, Agent, or Firm*—Sughrue, Mion, Zinn, Macpeak & Seas, PLLC

[57] ABSTRACT

A spoke for a bicycle wheel has a body of fiber reinforced plastic material provided at one end with a metal connecting element which is pivotally mounted on the spoke around an axis which is transverse relative to the spoke and having a threaded stem for connection to the wheel rim.

10 Claims, 3 Drawing Sheets

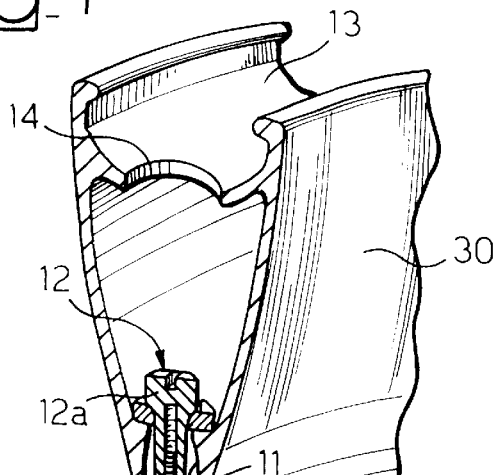
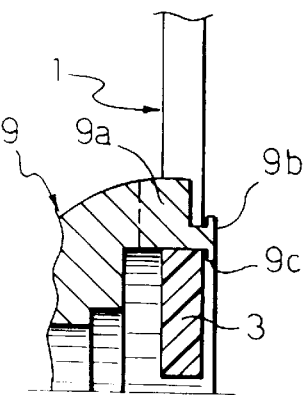
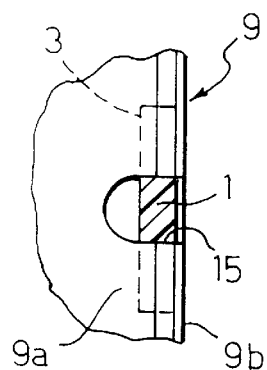
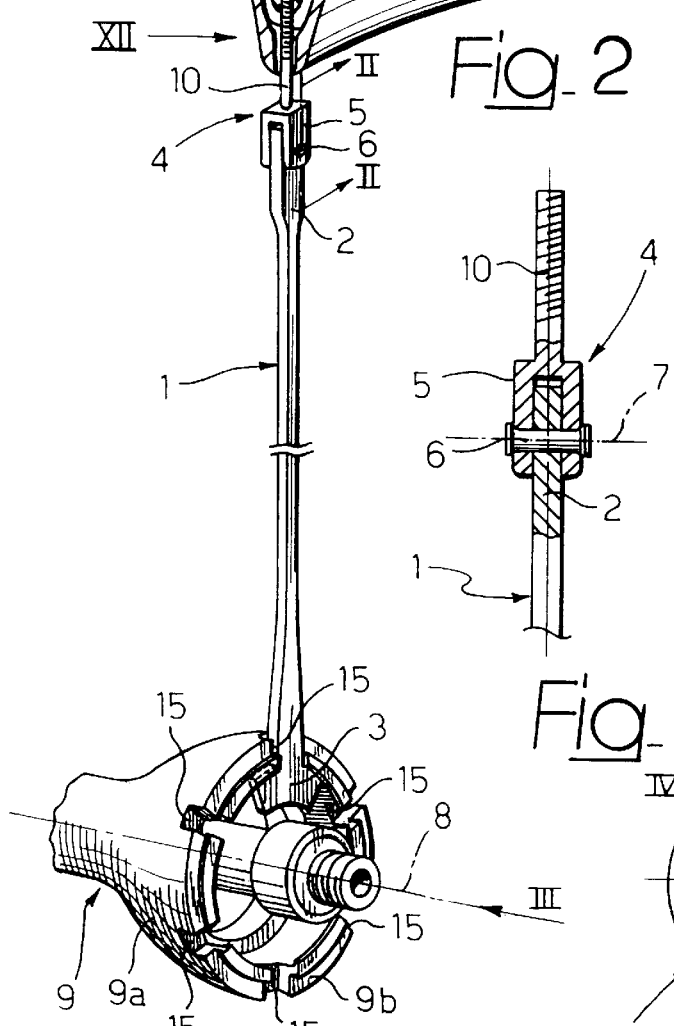
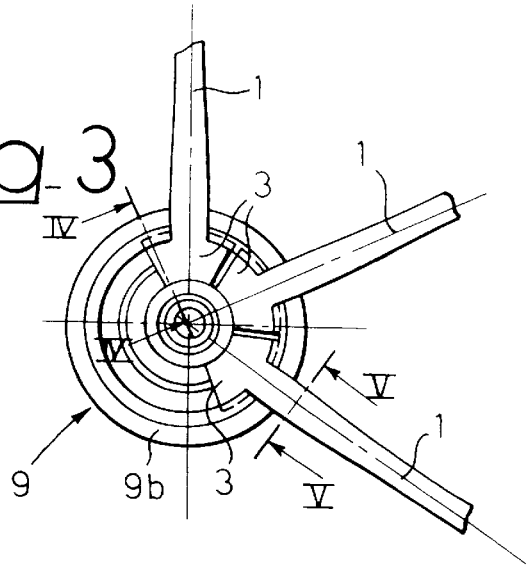

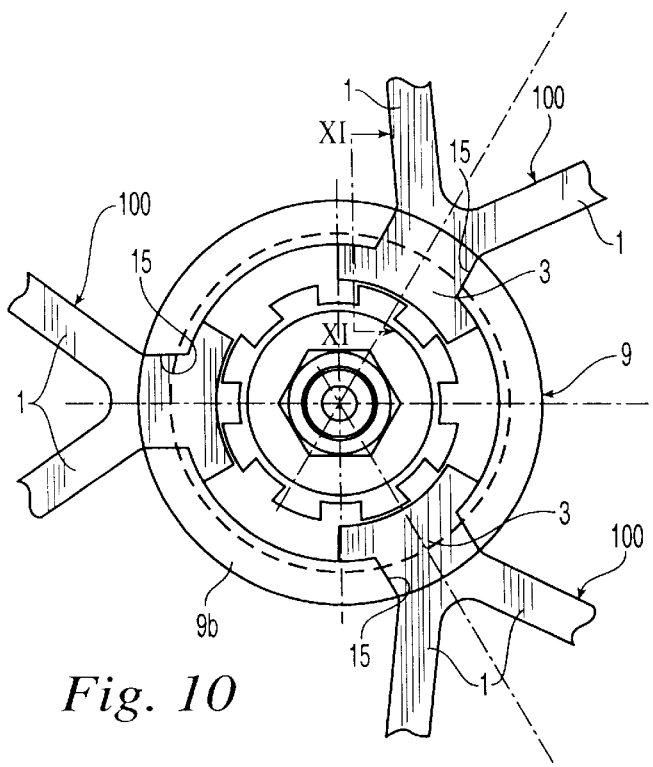
Fig. 10
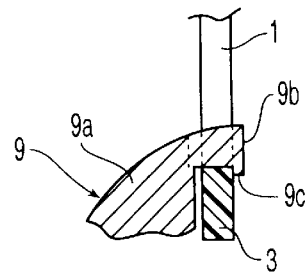
Fig. 11
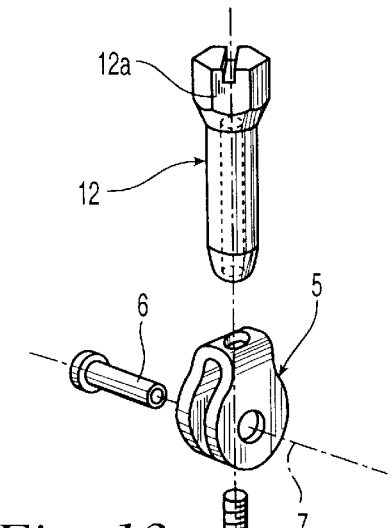
Fig. 13
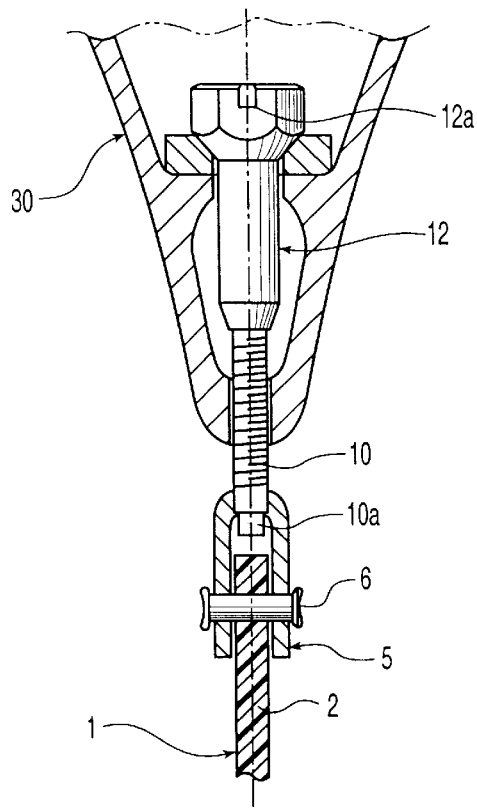
Fig. 12
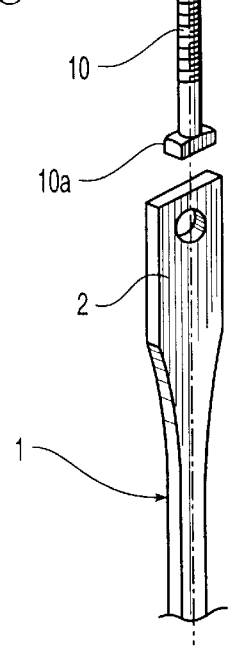

000000
SPOKE FOR A BICYCLE WHEEL AND WHEEL INCLUDING THIS SPOKE

BACKGROUND OF THE INVENTION

The present invention relates to bicycle wheel spokes, of the type comprising a body of fibre reinforced plastic material, such as a carbon fibre material.

In recent times, in the endeavour to decrease the weight of the bicycle, particularly in the case of race bicycles, studies have been more and more developed towards the use of spokes of fibre reinforced plastic material, such as carbon fibre reinforced material. The use of spoke of this type can provide an advantageous decrease of weight of about 3 grams for each spoke. In a typical case, a bicycle front wheel includes twelve spokes (six spokes on each side) and a rear wheel includes thirty-six spokes (twelve spokes on one side and twenty-four on the other side). Therefore, the decrease of weight may arrive to be in the order of 100 grams, which is not neglectable in a race bicycle. However, the use of spokes made of a fibre reinforced plastic material involves technological complications if one wants to connect the spoke to the wheel rim (which, as the hub, is made of metal, such as a light alloy) by threaded coupling means, in order to enable the spoke tension to be adjusted, similarly to what is made in the case of conventional metal spokes. Indeed, due to the use of the fibre reinforced plastic material it is not possible to form a thread on the spoke end as in the case of conventional metal spokes, where this spoke end engages a hole in the rim and receives an adjusting and locking nut or nipple.

SUMMARY OF THE INVENTION

The object of the present invention is that of providing a bicycle spoke of fibre reinforced plastic material which is able to solve the above mentioned problem efficiently.

In view of achieving this object, the invention provides a spoke for a bicycle wheel, comprising a body of fibre reinforced plastic material heaving ends provided with means for connections to a rim and a hub of a wheel respectively, characterized in that Said means for connecting the spoke to the rim comprises a connecting member made of steel pivotally mounted on one end of the body of the spoke around an axis perpendicular to the longitudinal direction of the spoke and including threaded connecting means for connection to the rim.

In a preferred embodiment, said threaded connecting means include a threaded stem which can be inserted into a hole of the rim, as well as an adjusting nut or nipple which can be screwed on said stem.

Due to said features, the spoke of composite material is connected to the rim in a way such that it can be adjusted, with no need of complicated technological operations for forming the spoke. The threaded stem is formed on a metal body, with no specific problem and said metal body is pivoted to the end of the spoke around an axis transverse relative to the longitudinal direction of the spoke. In this manner, a further advantage is obtained, lying in that when the spoke is mounted and adjusted, any misalignment between the connecting points of the spoke to the hub and the rim of the wheel can be taken up due to the possibility for the connecting metal member to rotate with respect to the spoke around said transverse axis.

In the above mentioned preferred embodiment, the afore mentioned metal connecting member has a fork-shaped portion articulated to a flattened end portion of the spoke which, in the mounted condition of the spoke on the wheel, is arranged with its plane orthogonally to the wheel axis. The threaded stem can be made in one piece with this fork-shaped portion or in a separate piece.

According Lo a further feature, the means for connecting the spoke to the hub comprises a flattened end of the spoke adapted to be received in a front seat formed in one end surface of the body of the wheel hub.

Preferably, this flattened end of the spoke which is to be connected to the hub has an enlarged head adapted to be received and locked within the above mentioned front seat of the hub.

In the case of a spoke which is to be mounted on one side of the bicycle rear wheel which is adjacent to the chain engaging sprockets, the spoke being arranged in a relationship relative to another spoke, the above mentioned flattened end of the spoke which is fixed to the hub is provided with threaded connecting means (such as a screw and a nut) for connection thereof to the hub.

In one variant, each pair of spokes which cross each other, which are to be arranged on the above mentioned side of the bicycle rear wheel, adjacent to the sprockets, is formed in a single piece of fibre reinforced plastic material, ending with a single enlarged flattened head adapted to be received and locked in said front seat of the bicycle wheel hub.

Naturally, the invention also provides a bicycle wheel including one or more spokes as described above.

As it will be clearly apparent from the foregoing description, the wheel according to the invention is characterized by having spokes made of fibre reinforced plastic material, which are lighter with respect to conventional metal spokes and never the less have the same ability of being adjusted as any conventional metal spokes. A further advantage deriving from the use of the spokes of a fibre reinforced plastic material lies in that when the adjusting operation is made, the nut or nipple engaging the threaded stem mounted onto the end of the spoke which is connected to the wheel rim is tightened and the spoke is not caused to become longer due to the tension, and the adjusting operation is carried out with a deformation only of the rim, which is a desired effect. On the contrary, in conventional wheels, when the adjustment operation is carried out a relevant elongation of the spoke also takes place.

A further advantage of the spoke according to the invention lies in that the above mentioned flattened and enlarged head provided at one end of the spoke which is connected to the hub acts also as a force distributing member, able to distribute the force transmitted by the spoke to the hub, along a wide surface thereof.

BRIEF DESCRIPTION OF THE DRAWINGS

Further features and advantages of the invention will become apparent from the description which follows with reference to the annexed drawings, given purely by way of non limiting example, in which:

FIG. 1 is a partial perspective view, partially in cross-section, of a bicycle wheel including a spoke according to the invention, FIG. 2 is a cross-sectional view taken along line II—II of FIG. 1, FIG. 3 is a front view according to arrow III of FIG. 1, FIG. 4 is a cross-sectional view taken along line IV—IV of FIG. 3, FIG. 5 is a cross-sectional view taken along line V—V of FIG. 3, FIG. 10 shows a variant of FIG. 6, FIG. 11 is a cross-sectional view taken along line XI—XI of FIG. 10, FIG. 12 shows a variant of the detail designated by XII in FIG. 1, and FIG. 13 is an exploded perspective view of the detail of FIG. 12.

DETAILED DESCRIPTION OF THE INVENTION

Figure 6:
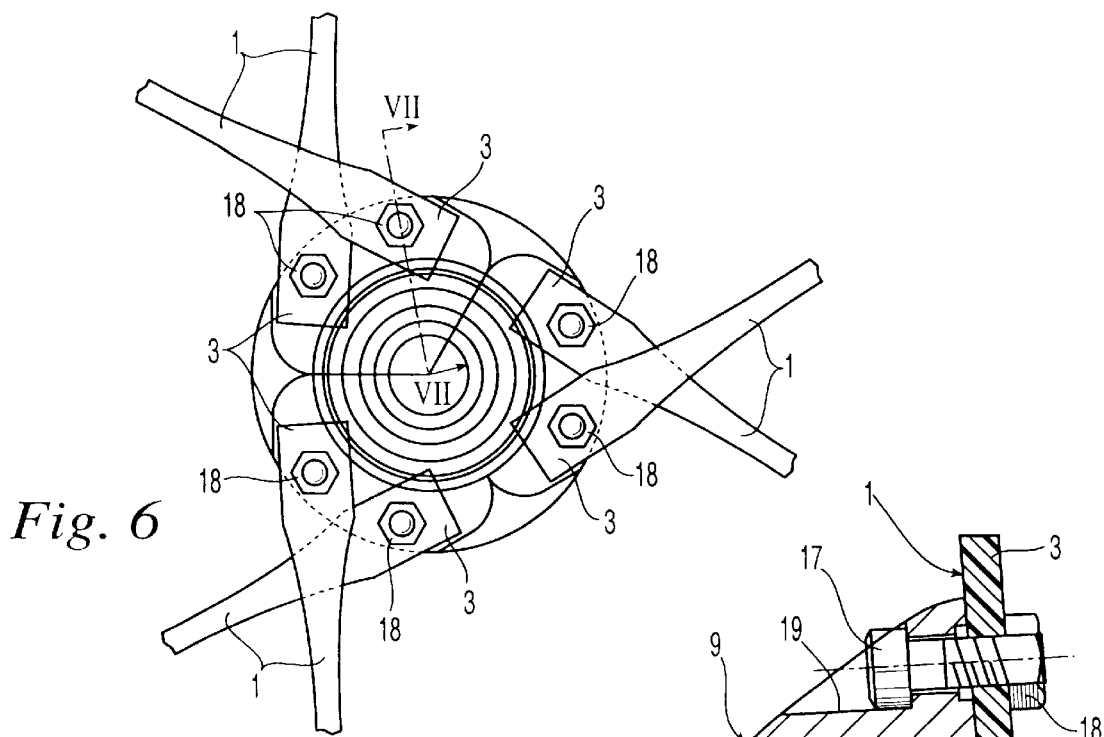
FIG. 6 shows a variant of FIG. 3 which refers to the end of the hub of a bicycle rear wheel adjacent to the chain engaging sprockets.
Figure 7:
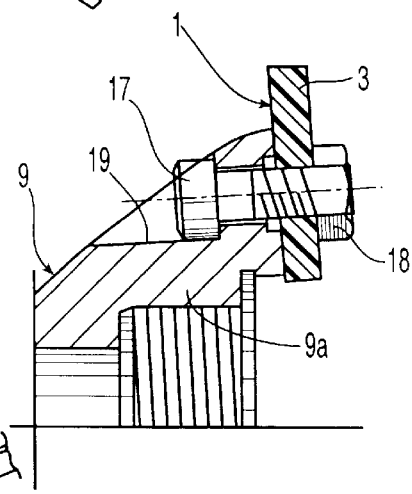
FIG. 7 is a cross-sectional view taken along line VII—VII of FIG. 6.
Figure 8:
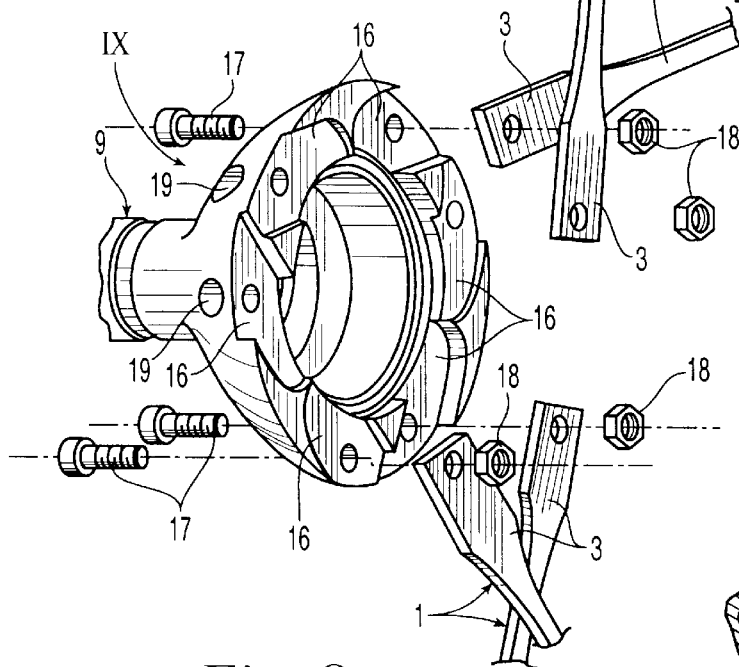
FIG. 8 is an exploded perspective view of the detail of FIG. 6.
Figure 9:
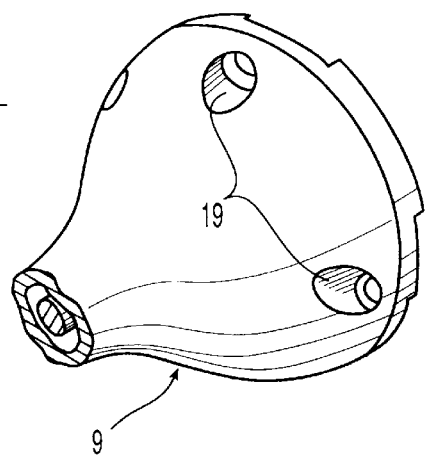
FIG. 9 is a perspective view taken along arrow IX of FIG. 8.

In FIG. 1, numeral 1 designates a spoke having a body of fibre reinforced plastic material, preferably reinforced with carbon fibres, according to the invention. The spoke 1, in the illustrated example, has a flattened configuration, with two enlarged end heads 2, 3. The end head 2 is connected to a rim 30 of aluminium alloy in a way such it can be registered. To this end, on the flattened end 2 of spoke 1 there is pivotally mounted a metal connecting element 4 having a fork-shaped portion 5 including two flattened ears which are pivotally mounted on opposite sides on the flattened end 2 of spoke 1 by a rivet 6 or any other similar connecting means, around an axis 7 perpendicular relative to the longitudinal direction of spoke 1. The metal connecting element 4 has a threaded stem 10, which in the example shown in FIGS. 1, 2 is in one piece with the fork-shaped portion 5. The threaded stem 10 engages a through hole 11 of rim 30, similarly to a conventional metal spoke, and is tightened and adapted to be adjusted within this hole 11 by a nut or nipple 12 absolutely similar to those normally used with conventional metal spokes. Also similarly to what is made with conventional spokes, the rim 30 has a hole 11 on its radially inner wall, whereas it has a radially outer wall 13 having apertures 14 which render possible for an operating tool to reach the head 12a of nipple 12.

On the side connected to hub 9, the body of spoke 1 has an enlarged head 3 having a T-shaped configuration. As shown in FIGS. 1 and 3–5, hub 9 has, similarly to what is disclosed in Italian patent application No. TO95A000425 of the same Applicant, which has been made open to public inspection on Nov. 26, 1996, a tubular end portion 9a ending with an annular surface 9b having a plurality of radial front slots 15 forming seats adapted to receive the ends of spokes 1. As clearly shown in FIGS. 1, 3, the width of each T-shaped head 3 is greater that the width of the respective front slot 15, so that each spoke 1 can be inserted to the respective slot 15 arranging the enlarged head 3 inside the tubular end portion 9a, so that the enlarged head 3 prevents a radial displacement of spoke 1 relative to hub 9. Furthermore, the end annular surface 9b of hub 9 has a lip 9c projecting radially inwardly which defines an annular stop shoulder which prevents a displacement of each T-shaped head 3 in a direction parallel to axis 8 of the hub, outwardly thereof (i.e. rightwardly with reference to FIG. 4).

When the spoke must be mounted, initially the spoke 1 is anchored to hub 9 by fitting the T-shaped head 3 within its seat, in the condition shown in FIGS. 1 and 3–5. After that, the threaded stem 10, which is pivotally mounted on end 2 of spoke 1 around axis 7, is inserted into hole 11 of the rim and tightened and registered by means of the nipple 12 which can be driven by a tool inserted through aperture 14 (FIG. 1). During this operation, spoke 1 is not subject to a substantial elongation, and it is mainly the deformation of rim 30 which allows the further tightening of nipple 12. When the wheel is mounted, it has a reduced weight with respect to a conventional wheel with metal spokes. At -he same time, the connection of spoke 1 to rim 30, with possibility of adjusting the spoke, does not involve t(-chronologically complicated or expansive operations for manufacturing the spoke 1.

FIGS. 6–9 show the solution for connecting spoke 1 to the hub in case the spoke must be mounted on the side of a rear bicycle wheel. adjacent to the sprockets which are to be engaged by the chain. In this case, according to the conventional art, the spokes I are arranged in pairs with the spokes of each pair crossing each other, as illustrated in FIG. 6. Also in this case, the inner ends of spokes 1 are flattened but do not have the T-shaped configuration shown in FIG. 1. These ends 3 are received within depressed seats 16 formed at: the front end surface of hub 9 (FIG. 8) and are fixed there by screws 17 and nuts 18. Screws 17 engage seats 19 (FIG. 9) formed in hub 9, whereas nuts 18 engage screws 17 on the side of seats 16 (see also FIG. 7). Naturally, the position of nuts and screws could be inverted.

FIG. 10 shows a variant in which the spokes 1 of each pair, which cross each other in FIG. 6 are formed in pairs in a single piece of a fibre reinforced plastic material, designated by 100 in FIG. 10, and ending with a single T-shaped head 3 which is received and locked in a seat 15 of the hub similarly to what has been disclosed with reference to FIG. 1.

FIGS. 12, 13 show a variant of FIG. 2, in which the metal connecting element 4 is constituted by two separated pieces: a fork-shaped element 5, and a screw 10 which engages a hole 5a of the fork-shaped element 5 and has a head 10a abutting against the inner bottom wall of element 5.

From the foregoing description it clearly appears that the spoke according to the invention provides the advantages of light weight which are typical of spokes of fibre reinforced plastic material on one hand, while keeping the possibility of adjusting the spoke, similarly to what happens with conventional metal spokes, on the other hand. At the same time, there is no need of technologically complicated operations for manufacturing the spoke of fibre reinforced plastic material. Also, the spoke according to the invention can be connected to the hub with simple, easy and rapid operations. The T-shaped head 3 which has been described above acts also as a force distributing element, adapted to distribute the force transmitted by the spoke on a wide surface of the hub.

Naturally, while the principle of the invention remains the same, the details of construction and the embodiments may widely vary with respect to what has been disclosed purely by way of example, without departing from the scope of the present invention.

For instance, it is possible to provide a wheel having a structure identical to that described above, but using metal spokes.

What is claimed is:

1. Spoke for a bicycle wheel, comprising a body of fibre reinforced plastic material, having opposite ends provided with means for connection to a wheel rim and a wheel hub respectively, wherein said means for connecting the spoke to the rim comprises a metal connecting member which is pivotally connected to one end of the body of the spoke by a pin having an axis perpendicular to the longitudinal direction of the spoke, and including threaded connecting means for connection to the rim.

2. Spoke according to claim 1, wherein said threaded connecting means include a threaded stem which can be engaged within a hole of the rim, and a nut or nipple which can be screwed on said threaded stem.

3. Spoke according to claim 2, wherein said metal connecting member comprises a fork-shaped portion articulated to a flattened end portion of the spoke.

4. Spoke according to claim 3, wherein the threaded stem is in one piece with said fork-shaped portion.

5. Spoke according to claim 3, wherein the threaded stem is constituted by an element which is separate from said fork-shaped portion.

6. Spoke according to claim 1, wherein said means for connecting the spoke to the hub comprises a flattened end of the spoke, adapted to be received within a front seat of the hub.

7. Spoke according to claim 6, wherein the flattened end which is to be fixed to the hub has an enlarged head, adapted to be received and locked within said front seat.

8. Spoke according to claim 6, in which the spoke is to be arranged on one side of a bicycle rear wheel, according to a crossed arrangement with another spoke, wherein said flattened end is provided with threaded connecting means for connection thereof to the hub.

9. Spoke according to claim 1, to be arranged on one side of a bicycle rear wheel, according to a crossed arrangement with another spoke, wherein said spoke is formed in one piece of fibre reinforced plastic material with another spoke, said piece ending with a single flattened end defining an enlarged head which is received and locked in a front seat which is formed on one end surface of the hub.

10. Bicycle wheel having at least one spoke, said spoke comprising a body of fibre reinforced plastic material, having opposite ends provided with means for connection to a wheel rim and a wheel hub respectively, wherein said means for connecting the spoke to the rim comprises a metal connecting member which is pivotally connected to one end of the body of the spoke by a pin having an axis perpendicular to the longitudinal direction of the spoke, and including threaded connecting means for connection to the rim.

* * * * *